United States Patent
Ruiz-Velasco

(10) Patent No.: US 8,533,758 B2
(45) Date of Patent: Sep. 10, 2013

(54) RETRIEVING SERVICE PROVIDER INFORMATION AND CHANNEL MAP VIA INTERNET PROTOCOL CONNECTIONS

(75) Inventor: Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 512 days.

(21) Appl. No.: 12/819,370

(22) Filed: Jun. 21, 2010

(65) Prior Publication Data

US 2011/0314504 A1    Dec. 22, 2011

(51) Int. Cl.
G06F 3/00 (2006.01)
G06F 13/00 (2006.01)
H04N 5/445 (2011.01)

(52) U.S. Cl.
USPC .............. 725/49; 725/38; 725/51; 725/56; 725/112; 725/115; 725/116; 725/134; 725/142; 725/151; 709/203; 709/219; 709/228

(58) Field of Classification Search
None
See application file for complete search history.

(56) References Cited

U.S. PATENT DOCUMENTS

| | | | |
|---|---|---|---|
| 7,010,568 B1 * | 3/2006 | Schneider et al. | 709/203 |
| 8,001,571 B1 * | 8/2011 | Schwartz et al. | 725/53 |
| 2002/0124170 A1 * | 9/2002 | Johnson, Jr. | 713/176 |
| 2003/0112792 A1 * | 6/2003 | Cranor et al. | 370/352 |
| 2005/0050577 A1 * | 3/2005 | Westbrook et al. | 725/134 |
| 2009/0158327 A1 * | 6/2009 | Song et al. | 725/38 |
| 2009/0158330 A1 * | 6/2009 | Song et al. | 725/39 |
| 2010/0319025 A1 * | 12/2010 | Lee et al. | 725/40 |
| 2011/0072465 A1 * | 3/2011 | Lee et al. | 725/45 |
| 2011/0202844 A1 * | 8/2011 | Davidson et al. | 715/723 |

* cited by examiner

Primary Examiner — Jason J Chung

(57) ABSTRACT

A digital television (DTV) receiver retrieves, from a memory, a standardized hostname and a standardized filename for a web-based service for providing a channel map associated with service providers. The DTV receiver adds, to the standardized hostname, a name for a particular service provider and sends, to a data server, a request for channel map information, where the request is based on the standardized hostname, the name for the particular service provider, and the standardized filename. The DTV receiver receivers, from the data server, a channel map file based on the standardized filename and extracts information from the channel map file to present to a user.

15 Claims, 6 Drawing Sheets

```xml
<?xml version="1.0" encoding="utf-8" ?>
<service_discovery>
  <provider name="BellMedia" CustomerServiceNumber="(800) 555-1255/>
  <channelmap totalchannels="3" startchannel="2" maxchannel="900">
    <channel
        number="2"
        chtype="ATSC"
        chname="ABC"
        modulation="8VSB"
        frequency="55.25"
        callsign="KTXU"
        definition="HD"
        serviceid="1234"
        encryption=""
        payperview="false"
        channeltier="Locals"
        />
    <channel
        number="400"
        chtype="Cable"
        chname="HBO"
        modulation="QAM256"
        frequency="560.31"
        callsign="HBO1"
        definition="SD"
        serviceid="2341"
        encryption="Motorola-CAS"
        payperview="false"
        channeltier="HBO Package"
        />
  </channelmap>
  <channeltiers numtiers="2">
    <channel_tier name="Local" tiertype="free"/>
    <channel_tier name="HBO Package" tiertype="subscrption">
  </channeltiers>
  <epgdata
      guidedata="getdata?start=%today%;end=%tomorrow%"
      channelinfo="getchannelinfo?sid=%serviceid%"
      programinfo="getprograminfo?sid=%serviceid%;time=%selected_time%"
  </epgdata>
</service_discovery>
```

- 500 (overall)
- 510 (provider / channelmap header)
- 520 (each channel block)
- 530 (epgdata block)

FIG. 5

RETRIEVING SERVICE PROVIDER INFORMATION AND CHANNEL MAP VIA INTERNET PROTOCOL CONNECTIONS

BACKGROUND INFORMATION

Modern digital television (DTV) systems are able to provide interaction between an end-user and a service provider (e.g., a television broadcaster) through the use of a return path. For example, a dialup modem, a high-speed Internet connection, or other mechanisms can be used for the return path to service providers with unidirectional networks, such as satellite or antenna broadcast. Other service providers may use bidirectional network links to incorporate a return path, such as coaxial and fiber optic cables. A DTV receiver that incorporates a return path may be referred to as a "connected DTV."

A DTV receiver typically includes an ATSC (Advanced Television Systems Committee) tuner and/or a QAM (quadrature amplitude modulation) tuner for receiving over-the-air television signals or cable television signals, respectively. To facilitate the reception of numerous channels, most DTV receivers are equipped with a channel auto-scanning function that automatically scans each channel to detect the presence of program content when such DTV receivers are turned on for the first time or after a re-boot.

DTV broadcast stations generally broadcast information such as their call letters and a "virtual" channel number as background data, and the radio frequency (RF) channel they use might be different from the virtual channel number. For example, a channel might be advertised as "39-1" (e.g., the virtual channel number) but may actually use RF channel 42. A DTV receiver typically matches the RF channels and virtual channels by scanning all of the available RF channel frequencies and checking each of the RF channel frequencies for a signal. If a signal is found, the DTV receiver can memorize the advertised channel number. This scanning process can take a long time and usually does not provide the DTV user with additional information about the channel unless the user tunes to that channel and waits for a data stream to be acquired.

BRIEF DESCRIPTION OF THE DRAWINGS

FIG. 5 is an example portion of a channel map data file according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable DTV receivers to retrieve service provider information and channel maps via IP, eliminating the need for DTV receivers to scan all channel frequencies during a system boot/reboot. In one implementation, a DTV receiver may retrieve, from a memory, a standardized hostname and a standardized filename for a web-based service that provides access to a channel map associated any one of multiple service providers. The DTV receiver may add, to the standardized hostname, a name for a particular service provider, and may send, to a data server, a request for channel map information. The request may be in the form of a uniform resource locator (URL) based on the standardized hostname, the name for the particular service provider, and the standardized filename. The DTV receiver may receive, from the data server, a channel map file based on the standardized filename and may extract information from the channel map file to present to a user of the DTV.

As used herein, the terms "digital television receiver" or "DTV receiver" may be broadly interpreted to include a digital television receiver, a digital television (e.g., a DTV receiver integrated with an associated display), a digital-to-analog converter box, an analog television with a digital converter box, or another device that may receive and/or present digital television signals.

Figure 1:
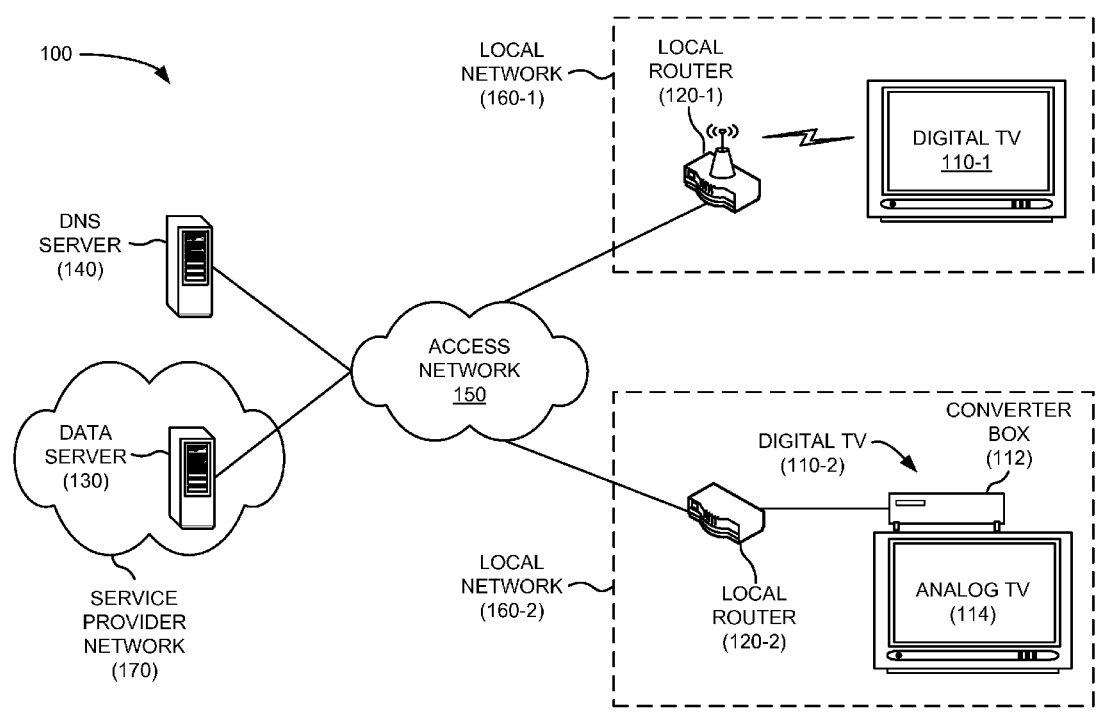
FIG. 1 depicts an example network in which systems and/or methods described herein may be implemented.

FIG. 1 is a diagram of an example network 100 in which systems and/or methods described herein may be implemented. As illustrated, environment 100 may include a digital television (TV) 110-1, a digital television 110-2 that includes a converter box 112 and an analog television 114, local routers 120-1 and 120-2 (herein referred to collectively as "local routers 120" and generically as "local router 120"), a data server 130, a domain name server 140, and an access network 150. Digital television 110-1 and digital television 110-2 may be herein referred to collectively as "digital televisions 110" and generically as "digital television 110." Digital televisions 110 and local routers 120 may be included within one or more local networks 160-1 and 160-2 (herein referred to collectively as "local networks 160" and generically as "local network 160"), such as home networks on customers' premises. Data server 130 may be included within a service provider network 170. Components of network 100 may interconnect via wired and/or wireless connections.

For simplicity, one access network 150, two local networks 160, and one service provider network 170 have been illustrated in FIG. 1. In practice, there may be more access networks, local networks, and service provider networks. Also, each of access network 150, local networks 160, and service provider network 170 may contain additional devices, fewer devices, different devices, or differently arranged devices than shown in FIG. 1. For example, data server 110 may include a virtual server that includes a group of servers that may logically appear as one server. Also, data server 110 may connect to one or more databases and other servers (not shown) to store and/or retrieve customer data for local networks 160. Furthermore, in some instances, one or more of the components of network 100 may perform one or more functions described as being performed by another one or more of the components of network 100.

Digital television 110 may include a connected digital television device that may receive and present digital television signals. Digital television 110 may include a memory component to store a well-known domain name system (DNS) hostname and a well-known filename for retrieving service provider information and/or channel map information. The well-known DNS hostname and the well-known filename may be stored, for example, by an original equipment manufacturer (OEM) prior to delivery of digital television 110 to a user. Digital television 110 may receive user inputs (e.g., via a remote control, not shown), such as a selected service provider name, that may also be stored in the memory component. Digital television 110 may use a return path, such as an IP connection implemented through a direct cable connection or router (e.g., local router 120), to send and/or receive communications to other devices. These communications may include, for example, a request for service provider information and/or channel map information. Digital television 110 may also include a processing component to parse and use files containing the requested service provider information and/or channel map information. Digital television 110 may also receive and display multimedia content delivered over access network 150 for perception by users. Digital television 110 may include technologies, such as cathode ray tube (CRT) displays, liquid crystal displays (LCDs), light-emitting diode (LED) displays, plasma displays, etc. Converter box 112 and analog TV 114 may be combined to provide a functional equivalent of digital television 110.

Local router 120 may include a device that may provide connectivity between equipment within local network 160 (e.g., digital television 110 and other devices, not shown) and between the local network 160 equipment and access network 150. Local router 120 may employ one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi) networks. In other implementations, local router may include wired connections, such as an Ethernet connection. In one implementation, some or all of the features of local router 120 may be included within another device, such as digital television 110-1 or converter box 112.

Data server 130 may include one or more server devices, or other types of computation or communication devices, that are capable of providing service provider information and/or channel map information to digital televisions 110 in accordance with signals that are issued from digital televisions 110. For example, data server 110 may provide a file (e.g., an Extensible Markup Language (XML) file) that includes information about the service provider controlling data server 130, available channels, and information on how to retrieve electronic guide data. Data server 130 may communicate with a variety of other components, such as third-party servers, databases, gateways, web servers, network switches or routers, television broadcast facilities, and other servers to facilitate delivery of service provider information and/or channel map information to digital televisions 110 via access network 150. In one implementation, data server 130 may be a part of an account-based network service provided by a subscription multimedia service provider.

DNS server 140 may include one or more server devices, or other types of computation or communication devices, that act to translate text-based domain names into numerical IP addresses that are used to route information in networks, such as network 100. For example, digital television 110 may initiate a DNS query and receive a result for the DNS query (e.g., a "DNS response") back from DNS server 140.

Access network 150 may include a network and system that permit transfer of data between digital television 110 (via local router 120), data server 130 and DNS server 140. Access network 150 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Access network 150 may provide digital televisions 110 with service provider information and/or channel map information provided by data server 130.

Local network 160 may include a private network, such as a LAN, an ad hoc network, and/or an intranet. Local network 160 may include a wired LAN and/or a wireless LAN (e.g., a Wi-Fi network). Along with digital television 110 and local router 120, local network 160 may also include additional devices (not shown), such as local gateways, personal computers, telephones, etc. Generally, local network 160 may provide digital televisions 110 with a relatively high bandwidth connection to access network 150 and/or service provider network 170. Devices within local network 160 may be connected via wired connections. Local network 160 may also be referred to as a home media network.

Service provider network 170 may represent a network associated with a particular service provider. For example, service provider network 170 may include a LAN or a combination of networks to collect, catalog, store, and/or distribute information related to the particular service provider and television channels available through the particular service provider. In one implementation, service provider network 170 may include additional devices (not shown) to collect, catalog, store, and/or distribute channel map information related service provider information.

In an example implementation using network 100, digital television 110 may determine that channel map information is required (e.g., as part of a start-up sequence). Digital television 110 may retrieve from memory a stored DNS hostname (e.g., "serviceprovider") and filename (e.g., "channelmap.xml") for retrieving service provider information and/or channel map information. Digital television 110 may insert a default domain (e.g., "bellmedia") for a particular service provider to create, for example, a text-based URL (e.g., "http://serviceprovider.bellmedia.com/channelmap.xml"). Using an IP connection via access network 150, DNS server 140 may resolve the URL and provide an alphanumeric IP address (e.g., an IPv4 or IPv6 address) for a data server (e.g., data server 130) associated with the particular service provider. Digital television 110 may then request the file (e.g., "channelmap.xml") from data server 130. Data server 130 may send (using an IP connection via access network 150) the requested file (e.g., "channelmap.xml") to digital television 110. Digital television 110 may store the file and/or parse information from the file to tune to the digital television channels.

Figure 2:
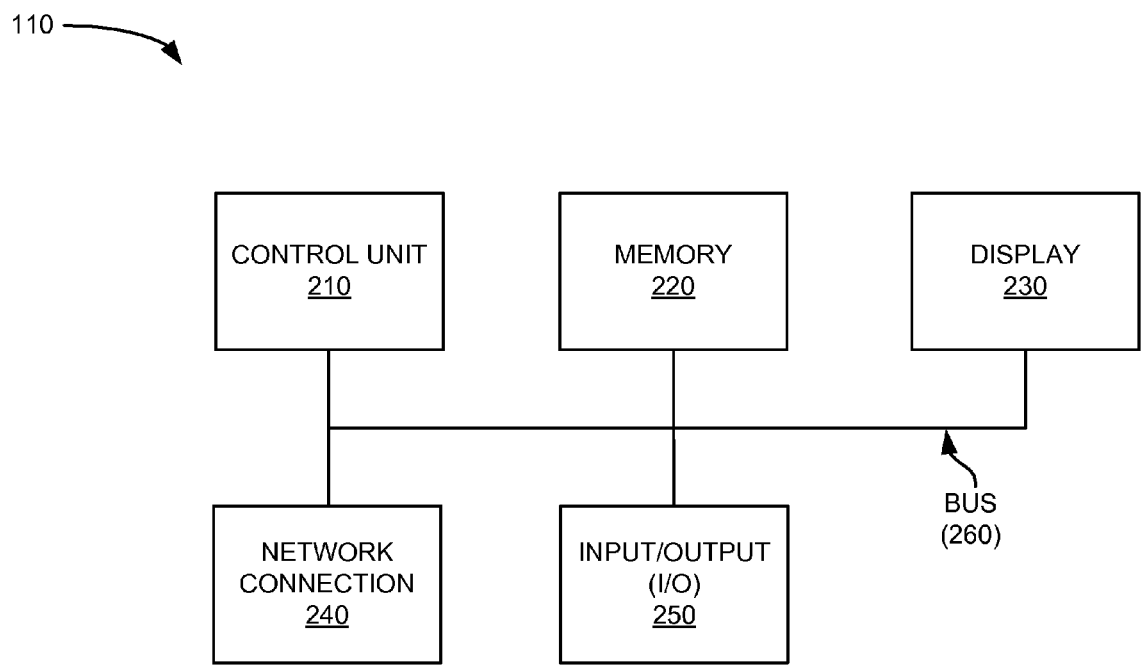
FIG. 2 is a block diagram of example components of a DTV tuner of FIG. 1.

FIG. 2 is diagram illustrating example components of a device 200 that may correspond to one or more components of digital television 110. Device 200 may include a control unit 210, memory 220, a display 230, a network connection 240, and input/output (I/O) devices 250.

Control unit 210 may include one or more processors, microprocessors, or other types of processing logic that may interpret and execute instructions. Memory 220 may include one or more dynamic or static storage devices that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Display 230 may include any component capable of providing visual information. For example, in one implementation, display 230 may be a liquid crystal display (LCD). In another implementation, display 230 may be any one of other display technologies, such as a plasma display panel (PDP), a field emission display (FED), a thin film transistor (TFT) display, etc. Display 230 may display, for example, text, images, and/or video information.

Network connection 240 may include any transceiver-like mechanism that enables device 200 to communicate with other devices and/or systems. For example, network connection 240 may include an Ethernet interface, an optical interface, a coaxial interface, a radio interface, or the like. Network connection 240 may allow for wired and/or wireless communication. Network connection 240 may be particularly configured to connect device 200 to a packet-based IP network (e.g., access network 150).

Input/output devices 250 may generally include user input devices, such as external buttons, a remote control, a keyboard, or a mouse; and output devices, such as speakers, display 230, or connections to peripheral devices. With input/output devices 250, a user may generally interact with device 200.

As will be described in detail below, device 200 may perform certain operations in response to control unit 210 executing software instructions contained in a computer-readable medium, such as memory 220. A computer-readable medium may be defined as a physical or logical memory device. A logical memory device may include memory space within a single physical memory device or spread across multiple physical memory devices. The software instructions may be read into memory 220 from another computer-readable medium, or from another device via network connection 240. The software instructions contained in memory 220 may cause control unit 210 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, and/or additional components than depicted in FIG. 2. Alternatively, or additionally, one or more components of device 200 may perform one or more other tasks described as being performed by one or more other components of device 200.

Figure 3:
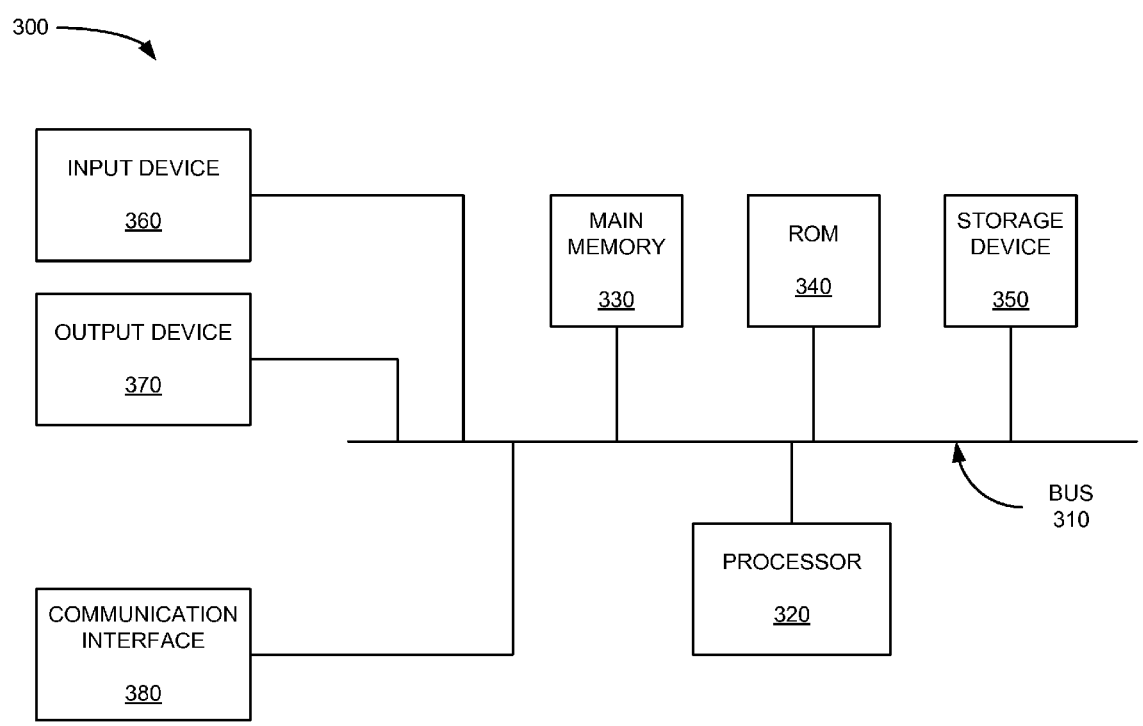
FIG. 3 is a block diagram of example components of a device that may correspond to a data server, a DNS server, and/or a set-top box of FIG. 1.

FIG. 3 is a diagram illustrating example components of a device 300 that may correspond to data server 130 and/or DNS server 140. As illustrated, device 300 may include a bus 310, a processor 320, a main memory 330, a ROM 340, a storage device 350, an input device 360, an output device 370, and a communication interface 380.

Bus 310 may include a path that permits communication among the components of device 300. Processor 320 may include one or more processors, microprocessors, or other types of processors, such as application-specific integrated circuits (ASICs), field-programmable gate arrays (FPGAs), etc., that may interpret and execute instructions.

Main memory 330 may include a RAM or another type of dynamic storage device that stores information and instructions for execution by processing logic 320. ROM 340 may include a ROM device or another type of static storage device that may store static information and instructions for use by processor 320. Storage device 350 may include a magnetic and/or optical recording medium and its corresponding drive. In one implementation, storage device 350 may also include a database.

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems.

As will be described in detail below, device 300 may perform certain operations associated with providing mobile media content distribution with DRM. Device 300 may perform these and other operations in response to processor 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processor 320 to perform processes that will be described later. Alternatively, hardwired circuitry may be used in place of, or in combination with, software instructions to implement processes consistent with example implementations. Thus, implementations described herein are not limited to any specific combination of hardware circuitry and software.

Although FIG. 3 illustrates example components of device 300, in other implementations, device 300 may include fewer components, additional components, different components, and/or differently arranged components than those depicted in FIG. 3. Alternatively, or additionally, one or more components of device 300 may perform one or more other tasks described as being performed by one or more other components of device 300.

Figure 4:
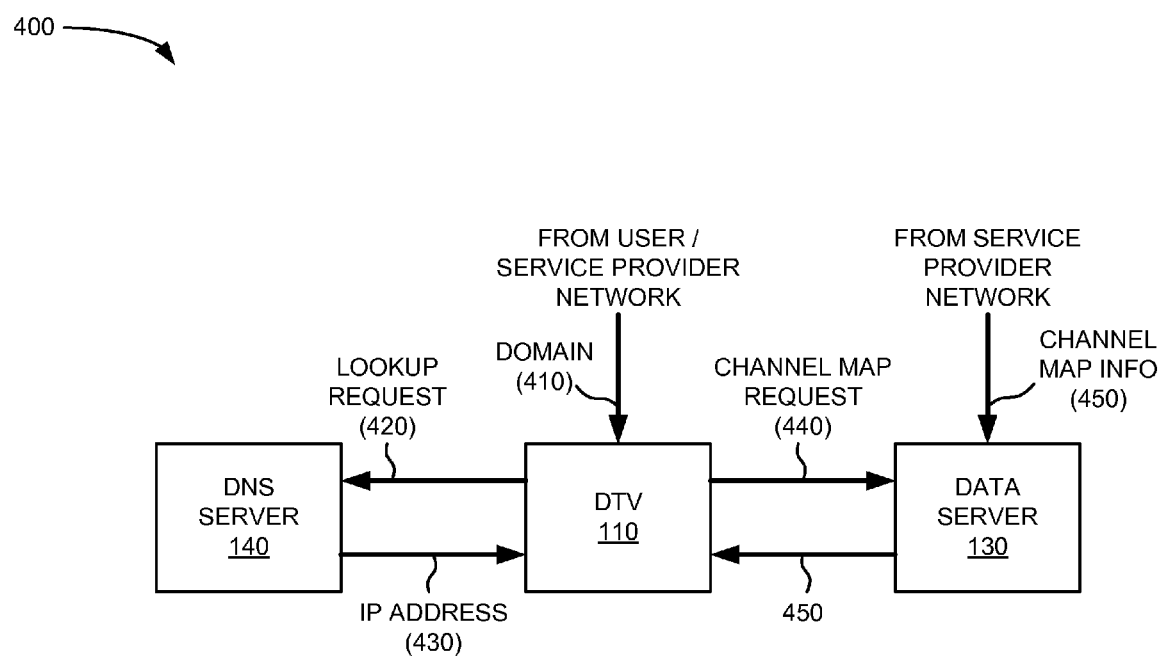
FIG. 4 is a diagram of example interactions between components of an example portion of the network of FIG. 1.

FIG. 4 is a diagram of example interactions between components of an example portion 400 of network 100. As illustrated, example network portion 400 may include digital television 110, data server 130, and DNS server 140. Digital television 110, data server 130, and DNS server 140 may include the features described above in connection with one or more of FIGS. 1-3.

Digital television 110 may be configured with a well-known (e.g., standardized) DNS hostname and URL format to invoke a web-based service for providing service provider information and/or a channel map associated with a particular service provider. The DNS location may be mapped by the service provider to the correct host IP address where the web service resides. Upon, for example, an initial start-up of digital television 110, digital television 110 may seek information regarding available channels. Digital television 110 may retrieve from memory (e.g., memory 220) the well-known DNS hostname and a well-known filename that may be used to retrieve service provider information and/or channel map information from any one of a group of available service providers. Digital television 110 may receive a default domain 410 associated with a service provider. In one implementation, default domain 410 may be a user input name (e.g., typed in as a user prompt, or selected from menu of a group of known service provider domain names, via a remote control). In another implementation default domain 410 may be received from a service provider network (e.g., a device within service provider network 170, such as data server 130) using an IP connection.

Digital television 110 may generate a lookup request 420 based on the DNS hostname and service provider domain 410. For example, a DNS hostname may include a well-known hostname (e.g., "serviceprovider") and default domain 410 (e.g., "bellmedia"). Digital television 110 may insert a default domain (e.g., "bellmedia") for the current service provider to create a text-based URL (e.g., "http://serviceprovider.bellmedia.com/channelmap.xml"). Digital television 110 may send lookup request 420 to DNS server 140. DNS server 140 may conduct one or more DNS queries (e.g., recursive or non-recursive queries) to translate the name from lookup request 420 into an IP address 430. DNS server 140 may send IP address 430 to digital television 110.

Digital television 110 may receive IP address 430 and may, in turn, provide a channel map request 440 to data server 130. Channel map request 440 may include the IP address and the well-known filename (e.g., "channelmap.xml") for retrieving service provider information and/or channel map information. Data server 130 may receive channel map request 440 and retrieve channel map information 450 based on channel map request 440. In one implementation, channel map information 450 may be provided to data server 130 (e.g., from another device in service provider network 170) in the form of a file associated with the well-known filename. Data server 130 may send channel map information 450 to digital television 110. Channel map information 450 may be provided in one of a variety of formats including, for example, xml, simple text (txt), Hypertext Mark-up Language (html), Perl script, etc. A sample channel map file that may be provided with channel map information 450 is described below in connection with FIG. 5.

Digital television 110 may receive channel map information 450 from data server 130 and parse the information to provide channel information and/or service provider information when requested by a user (e.g., by a command issued from a remote control). Thus, digital television may obtain channel map information as a single file and provide information for any particular channel without the need to scan all the available channels.

The well-known hostname and well-known filename may be implemented, for example, as part of a standard protocol, such as an ATSC digital standard. Thus, manufacturers of digital television 110 and devices (e.g., data server 130, DNS server 140, etc.) associated with service providers may have a readily available communications protocol for channel information.

Although FIG. 4 illustrates example components of network portion 400, in other implementations, network portion 400 may include fewer components, additional components, different components, and/or differently arranged components than those depicted in FIG. 4. Alternatively, or additionally, one or more components of network portion 400 may perform one or more other tasks described as being performed by one or more other components of network portion 400.

FIG. 5 is an example portion 500 of a channel map data file (e.g., channel map information 450) according to implementations described herein. As shown in FIG. 5, portion 500 may include information 510 about the service provider, available channel information 520, and information 530 on how to retrieve electronic guide information. Example portion 500 of the channel map data file may be provided in xml format, although other formats may be used.

Information 510 about the service provider may include, for example, a service provider name, division, and/or customer service number (e.g., a telephone number). Other service provider contact information (e.g., email, regional representatives, etc.) may also be included in information 510.

Available channel information 520 may include data about each of the available channels from the service provider. For example, channel information 510 may include fields for each channels, such as a channel number field (e.g., "number"), a channel type field (e.g., "chtype"), a channel name field (e.g., "chname"), a modulation for the channel field (e.g., "modulation"), an RF frequency for the channel field (e.g., "frequency"), a call sign field for the broadcast station associated with the channel (e.g., "callsign"), a definition (standard definition, high definition, etc.) designation field (e.g., "definition"), a service identifier field (e.g., "serviced," to link to metadata for electronic guides), an encryption type field (e.g., "encryption"), a pay-per-view designator field (e.g., "payperview), and a channel tier field (e.g., "channeltier"). Portion 500 includes channel information 520 for two channels. The complete channel map may include numerous other channels (e.g., hundreds or thousands of channels) so as to provide channel information for all available RF channel frequencies from a particular service provider.

Information 530 on how to retrieve electronic guide information may include commands and formats for retrieving electronic program guide information. For example, information 530 may include a field for retrieving guide data (e.g., "guidedata"), a field for retrieving individual channel metadata (e.g., "channelinfo"), and a field for retrieving individual program metadata (e.g., "programinfo").

In one implementation, the channel map data file may also include an expiration date or another indicator to ensure that current channel map information is maintained. The channel map data file may include instructions for digital television 110 to delete the channel map file based on the expiration date. For example, if digital television 110 identifies that an expiration date in the channel map data file has passed, digital television 110 may automatically delete the existing channel map file and initiate a request for an updated channel map file in accordance with the procedures outlined above.

Although FIG. 5 illustrates example portion 500 of a channel map data file, in other implementations, portion 500 may include less information, additional information, different information, and/or differently arranged information than depicted in FIG. 5.

Figure 6:
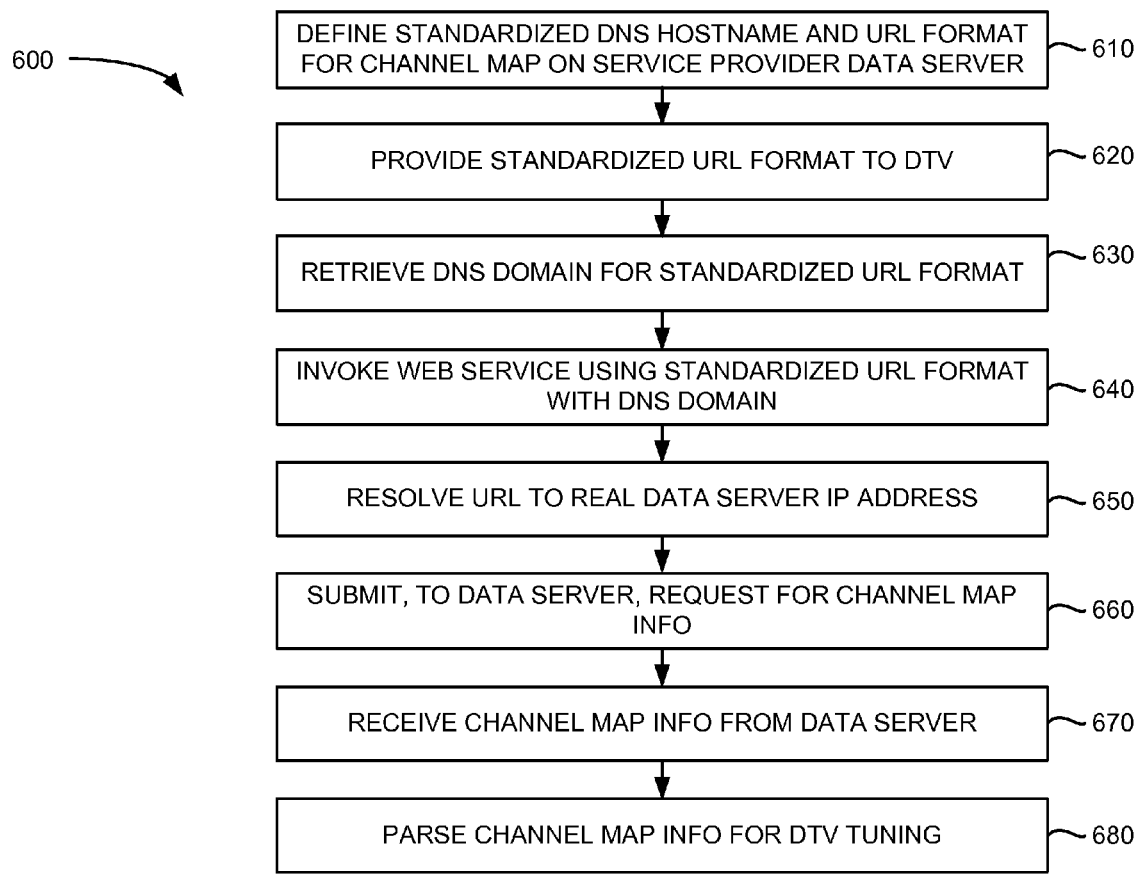
FIG. 6 provides a process flow illustrating example operations to retrieve service provider information and/or a channel map via an Internet protocol (IP) connection according to implementations described herein.

FIG. 6 provides a process flow 600 illustrating example operations to retrieve service provider information and/or a channel map via an IP connection. The operations may be performed by one or more devices within network 100, such as digital television 110, data server 130, and/or DNS server 140. In some implementations, certain operations may be performed by digital television 110 in conjunction with one or more other devices.

Process 600 may include defining a standardized DNS hostname and URL format for a channel map on a service provider data server (block 610) and providing a standardized URL format to a digital television (block 620). For example, as described above in connection with FIG. 4, a well-known (e.g., standardized) DNS location may be mapped by the service provider to a host IP address where the web service resides. Digital television 110 may be configured with the well-known DNS hostname and URL format to invoke a web-based service for providing service provider information and/or a channel map associated with a particular service provider.

Returning to FIG. 6, process 600 may include retrieving the standardized DNS hostname and URL format for the service provider channel map (block 630) and invoking a web service using the standardized URL format with a DNS domain (block 640). For example, as described above in connection with FIG. 4, upon an initial start-up of digital television 110, digital television 110 may seek information regarding available channels. Digital television 110 may retrieve from memory (e.g., memory 220) the well-known DNS hostname and a well-known filename that may be used to retrieve service provider information and/or channel map information from any one of a group of available service providers. Digital television 110 may receive default domain 410 associated with a service provider. In one implementation, default domain 410 may be a user-configured input (e.g., typed in as a user prompt or selected from menu of know service provider domains via a remote control). In another implementation default domain 410 may be received from a service provider network (e.g., a device within service provider network 170).

Process 600 may also include resolving the URL to a real data server IP address (block 650) and submitting, to the data server, a request for channel map information (block 660). For example, as described above in connection with FIG. 4, digital television 110 may generate lookup request 420 based on the DNS hostname and service provider domain 410. For example, a DNS hostname may include a well-known hostname (e.g., "serviceprovider") and default domain 410 (e.g., "bellmedia"). Digital television 110 may insert a default domain (e.g., "bellmedia") for the current service provider to create a text-based URL (e.g., "http://serviceprovider.bellmedia.com/channelmap.xml"). Digital television 110 may send lookup request 420 to DNS server 140. DNS server 140 may conduct one or more DNS queries (e.g., recursive or non-recursive queries) to translate the name of lookup request 420 into IP address 430. DNS server 140 may send IP address 430 to digital television 110. Digital television 110 may receive IP address 430 and may, in turn, provide channel map request 440 to data server 130. Channel map request 440 may include the IP address and the well-known filename (e.g., "channelmap.xml") for retrieving service provider information and/or channel map information.

Process 600 may further include receiving channel map information from the data server (block 670) and parsing the channel map information for digital television tuning (block 680). For example, as described above in connection with FIG. 4, data server 130 may receive channel map request 440 and retrieve channel map information 450 based on channel map request 440. In one implementation, channel map information 450 may be provided to data server 130 (e.g., from another device in service provider network 170) in the form of a file associated with the well-known filename. Data server 130 may send channel map information 450 to digital television 110. Channel map information 450 may be provided in one of a variety of file formats including, for example, Extensible Markup Language (xml), simple text (txt), Hypertext Mark-up Language (html), Perl script, etc.

Systems and/or methods described herein may provide a DTV system to retrieve service provider information and/or a channel map via an IP connection. A DTV receiver may retrieve, from a local memory, a standardized hostname and a standardized filename. The DTV receiver may add, to the standardized hostname, a domain name for a particular service provider and generate, based on the standardized hostname, the name for the particular service provider, and the standardized filename, a URL to request channel map information. A DNS server may resolve the URL to an alphanumeric IP address for a data server associated with the particular service provider. The data server may receive, via the IP connection, the URL request, retrieve the channel map file, and send, to the DTV receiver and via the IP connection, the channel map file. The DTV receiver may receive the channel map file and extract, from the channel map file, a complete set of channel information that can be presented to a user without the need to scan all available RF channel frequencies.

The foregoing description provides illustration and description, but is not intended to be exhaustive or to limit the implementations to the precise form disclosed. Modifications and variations are possible in light of the above teachings or may be acquired from practice of systems and/or methods disclosed herein. For example, while communications between a digital television and a data server have been described primarily in the context of Internet protocol, in other implementations one or more other standard connectivity protocols may be used, such as DOCSIS, TCP/IP, etc.

Also, while a series of blocks has been described with regard to the flowchart of FIG. 6, the order of the blocks may differ in other implementations. Further, non-dependent blocks may be performed in parallel.

It will be apparent that implementations, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a digital television receiver, comprising:

retrieving, by the digital television receiver and from a local memory, a uniform resource locator (URL) format including a standardized hostname and a standardized filename for a web-based service for providing channel map files, each of the channel map files associated with different television service providers, wherein the standardized hostname and the standardized filename are stored in the local memory prior to delivery of the digital television receiver to a user;

receiving, by the digital television receiver, a name for a particular television service provider of the television service providers;

generating, by the digital television receiver, a lookup request by inserting the name for the particular television service provider into the URL format that includes the standardized hostname and the standardized filename;

receiving, by the digital television receiver and from a domain name system (DNS) server, an Internet protocol (IP) address that is responsive to the lookup request;

sending, by the digital television receiver and to a data server, a channel map information request based on the IP address and the standardized filename retrieved from the local memory;

receiving, by the digital television receiver and from the data server, a particular channel map file based on the standardized filename, wherein the digital television receiver stores the particular channel map file; and extracting, by the digital television receiver, parsed digital television channel information from the particular stored channel map file to present to the user.

2. The method of claim 1, wherein the standardized hostname and the standardized filename are stored in the local memory by an original equipment manufacturer (OEM).

3. The method of claim 1, where the name for the particular television service provider is provided by the user.

4. The method of claim 1, where the name for the particular television service provider is provided by the television service provider via a network connection.

5. The method of claim 1, where the name for the particular television service provider is selected from a group of names of television service providers stored in the local memory.

6. The method of claim 1, where the particular channel map file includes an expiration date and instructions for the digital television receiver to delete the particular channel map file based on the expiration date.

7. The method of claim 1, where the particular channel map file includes Extensible Markup Language (XML).

8. The method of claim 1, wherein the particular channel map file includes information for multiple subscription tiers of channels available from the particular television service provider.

9. The method of claim 8, where the particular channel map file includes information about the particular television service provider and information about how to retrieve electronic guide data.

10. A digital television receiver, comprising:
a memory to store instructions, a standardized hostname, and a standardized filename for providing channel map files, each of the channel map files associated with different television service providers, wherein the standardized hostname and the standardized filename are stored in the memory by an original equipment manufacturer (OEM) prior to delivery of the digital television receiver to a user; and
a processor to execute the instructions to:
retrieve, from the memory, the standardized hostname and the standardized filename;
concatenate the standardized hostname and a name for a particular television service provider;
send, to a domain name system (DNS) server as a uniform resource locator (URL), a lookup request, wherein the URL includes the standardized hostname and the name for the particular television service provider;
receive from the DNS server, an Internet protocol (IP) address based on the URL;
send, to a data server, a channel map information request that includes the IP address and the standardized filename;
receive, from the data server, a particular channel map file based on the standardized filename, wherein the digital television receiver stores the particular channel map file; and
extract, from the stored particular channel map file, parsed digital television channel information to present to the user.

11. The digital television receiver of claim 10, where the processor is further to execute instructions in the memory to:
identify an expiration date for the particular channel map file, and
delete the particular channel map file based on the expiration date.

12. The digital television receiver of claim 10, where the memory further stores a group of names of television service providers, and where the name for the particular television service provider is selected from the group of names.

13. A digital television system, comprising:
a digital television receiver to:
retrieve, from a local memory, a uniform resource locator (URL) format including a standardized hostname and a standardized filename in accordance with a known communications protocol for providing channel map files, each of the channel map files associated with different television service providers, wherein the standardized hostname and the standardized filename are stored in the local memory prior to delivery of the digital television receiver to a user,
receive, from a user of the digital television receiver, a name for a particular television service provider of a group of television service providers,
generate, by inserting the name for the particular television service provider into the standardized hostname and the standardized filename, a uniform resource locator (URL) request for channel map information that is sent to a Domain Name System (DNS) server,
receive, from the DNS server, an Internet protocol (IP) connection address based on the URL,
receive, via the IP connection, a particular channel map file based on the standardized filename, wherein the digital television receiver stores the particular channel map file, and
extract, from the stored particular channel map file, parsed digital television channel information to present to the user; and
a data server to:
receive, via the IP connection, the URL request,
retrieve the particular channel map file for the particular television service provider based on the URL request, and
send, to the digital television receiver and via the IP connection, the particular channel map file for the particular television service provider.

14. The system of claim 13, wherein the standardized hostname and the standardized filename are stored in the local memory of the digital television receiver by an original equipment manufacturer (OEM).

15. The system of claim 13, wherein the name for the particular service provider is provided to the digital television receiver by the user.

* * * * *